(12) United States Patent
Semyonov et al.

(10) Patent No.: US 12,373,304 B2
(45) Date of Patent: Jul. 29, 2025

(54) VALIDATION OF THE BACKUP CONSISTENCY USING MACHINE LEARNING FOR BOOT SCREENSHOT RECOGNITION

(71) Applicant: Acronis International GmbH, Schaffhausen (CH)

(72) Inventors: Vasily Semyonov, Sofia (BG); Evgenii Kabantsev, Maastricht (NL); Mikhail Rybakov, Istanbul (TR); Anton Enakiev, Sofia (BG); Serg Bell, Costa del Sol (SG); Stanislav Protasov, Singapore (SG); Ivan Krestinin, Turin (IT)

(73) Assignee: Acronis International GmbH, Schaffhausen (CH)

( * ) Notice: Subject to any disclaimer, the term of this patent is extended or adjusted under 35 U.S.C. 154(b) by 167 days.

(21) Appl. No.: 18/344,330

(22) Filed: Jun. 29, 2023

(65) Prior Publication Data
US 2025/0004884 A1 Jan. 2, 2025

(51) Int. Cl.
| G06F 11/00 | (2006.01) |
| G06F 11/14 | (2006.01) |
| G06F 21/31 | (2013.01) |
| G06F 21/62 | (2013.01) |

(52) U.S. Cl.
CPC ...... *G06F 11/1456* (2013.01); *G06F 11/1484* (2013.01); *G06F 21/31* (2013.01); *G06F 21/6227* (2013.01)

(58) Field of Classification Search
CPC ............ G06F 11/1456; G06F 11/1484; G06F 11/0712; G06F 11/073
See application file for complete search history.

(56) References Cited

U.S. PATENT DOCUMENTS

| 9,053,216 | B1 | 6/2015 | Coleman et al. |
| 9,977,706 | B2 | 5/2018 | Korotaev et al. |
| 10,044,801 | B1 | 8/2018 | Tyurumov et al. |
| 10,114,980 | B2 | 10/2018 | Barinov et al. |
| 10,409,688 | B2 | 9/2019 | Tormasov |
| 10,613,935 | B2 | 4/2020 | Tormasov et al. |
| 10,754,753 | B1 * | 8/2020 | Cogley ............... G06F 11/1438 |
| 10,983,877 | B1 | 4/2021 | Hoffman et al. |
| 11,621,834 | B2 | 4/2023 | Will et al. |
| 2018/0101425 | A1 | 4/2018 | McChord et al. |
| 2023/0004463 | A1 * | 1/2023 | Mitchell .................. G06N 3/04 |

OTHER PUBLICATIONS

International Search Report and Written Opinion for PCT/US2021/065438 date mailed Apr. 22, 2022.

* cited by examiner

*Primary Examiner* — Katherine Lin
(74) *Attorney, Agent, or Firm* — ESPE Legal Consultancy FZ-LLC

(57) ABSTRACT

A system and method for validating the consistency of a computer backup mounts the backup as a virtual machine on a hypervisor host. A screenshot of the virtual machine's boot screen is recorded and sent to a machine-learning service for verification of boot status. The resulting boot status as successful or failed is recorded in metadata associated with that computer backup.

20 Claims, 5 Drawing Sheets

VALIDATION OF THE BACKUP CONSISTENCY USING MACHINE LEARNING FOR BOOT SCREENSHOT RECOGNITION

TECHNICAL FIELD

Embodiments relate to systems and methods that use machine learning in connection with validating backups of computer systems.

BACKGROUND

In computer systems, backups are extremely important for maintaining data integrity and user uptime. Ideally, system users should have complete confidence in their backups. Data should be in its expected state after recovery from a backup. In the worst-case scenario, users may discover that their backups are corrupt without warning and when it's too late to fix the problem. This may lead to unavoidable data loss events with serious consequences.

Another concern is that even though backup software may be able to restore the backup with uncorrupted data, data loss may still occur because the data was not captured in a proper state during the initial backup. In other words, the backup itself is not corrupted, but the data within the backup is corrupted. This condition typically results in the inability to successfully boot the operating system after recovery from the backup.

One solution to this problem is temporarily mounting the backup as a virtual machine so that tests may be run against this virtual machine. For example, while mounted as a virtual machine, the backup can be tested by booting it up, logging into the operating system, and verifying the state of applications.

But this solution lacks efficiency at scale. In some use cases, there may be thousands of systems being backed up. When working with thousands of backups, performing manual validation that backups will produce a bootable system is simply too labor-intensive. More efficient solutions are needed.

SUMMARY

A method is disclosed for validating the consistency of a backup in a computer system comprising a hypervisor host, a screenshot-analysis service, a virtual-machine emulation service on the hypervisor host, and a backup archive where the backup is stored. The backup archive is emulated as a guest virtual machine (VM) with a guest operating system (OS) on the hypervisor host. The guest VM is booted and a screenshot is taken of the guest VM console. This screenshot comprises an image of the guest OS boot screen. The screenshot is analyzed using the screenshot-analysis service to determine whether the screenshot reflects a successful boot of the guest OS. The screenshot-analysis service determines whether the screenshot reflects a successful boot using a machine-learning model trained with data from successful and unsuccessful boot screen images. The determination of the screenshot-analysis service is then associated with the backup as backup metadata in the backup archive.

A system is also disclosed for validating the consistency of a computer backup from a screenshot. The system comprises a hypervisor host and a virtual-machine emulation service on the hypervisor host. The system is configured so that the virtual machine is mounted on the hypervisor host and comprises a guest operating system (OS). The hypervisor host includes a screenshot tool for capturing an image of the guest OS boot screen. A screenshot-analysis service includes a machine-learning model trained with data from successful and failed boot screen images. The machine-learning model is configured to make boot determinations corresponding to successful or failed booting of the guest OS. A backup archive where the computer backup is stored is provided and configured to store the results of boot determinations.

A system for validating a backup is also disclosed and comprises a backup archive comprising a plurality of backups; computing hardware of at least one processor and memory operably coupled to the at least one processor; and instructions that, when executed on the computing hardware, cause the computing hardware to implement: a backup agent configured to: access at least one of the plurality of backups from the backup archive, instruct a hypervisor host to mount the at least one of the plurality of backups as a virtual machine, and monitor emulation of the at least one of the plurality of backups, the emulation having reached an OS boot screen, and a machine learning service including a machine learning model pretrained on images of successful boot screens and failed boot screens and configured to determine whether the OS boot screen is a successful or failed boot of the at least one of the plurality of backups.

A system for validating a backup is also disclosed and comprises: a backup storage database comprising a plurality of backups; a hypervisor host configured to mount a selected backup from the plurality of backups, and emulate the selected backup to an OS boot screen; and a backup service comprising: a backup agent configured to receive a screenshot of the OS boot screen, and a machine learning model pretrained on boot screen images and configured to determine whether the screenshot of the OS boot screen is a successful or failed boot of the selected backup.

A method for validating a backup is also disclosed and comprises: emulating the backup on a virtual machine to reach a boot screen; obtaining a screenshot of the emulated backup, the screenshot including the boot screen; analyzing the screenshot using a machine learning model to determine whether the boot screen is associated with a successful boot of the backup or an unsuccessful boot of the backup; when the screenshot is determined to be associated with a successful boot of the backup, marking the screenshot as a successful boot of the backup; when the screenshot is determined to be associated with an unsuccessful boot of the backup, marking the screenshot as an unsuccessful boot of the backup; and storing the screenshot and the marking in a data store.

A method for validating a backup is also disclosed and comprises: obtaining a screenshot of an emulated backup on a virtual machine; analyzing the screenshot using a first machine learning model to determine whether the screenshot is associated with a successful boot of the emulated backup or an unsuccessful boot of the emulated backup; when the analyzing determines a successful boot of the emulated backup, reporting an indication of the successful boot to a user; when the analyzing determines an unsuccessful boot of the emulated backup, converting the screenshot to machine-readable text using optical character recognition; and analyzing the machine-readable text using a second machine learning model to determine an indication the successful boot of the emulated backup or the unsuccessful boot of the emulated backup based on a plurality of keywords indicative of the successful boot of the emulated backup and a plurality of keywords indicative of the unsuccessful boot of the emulated backup.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
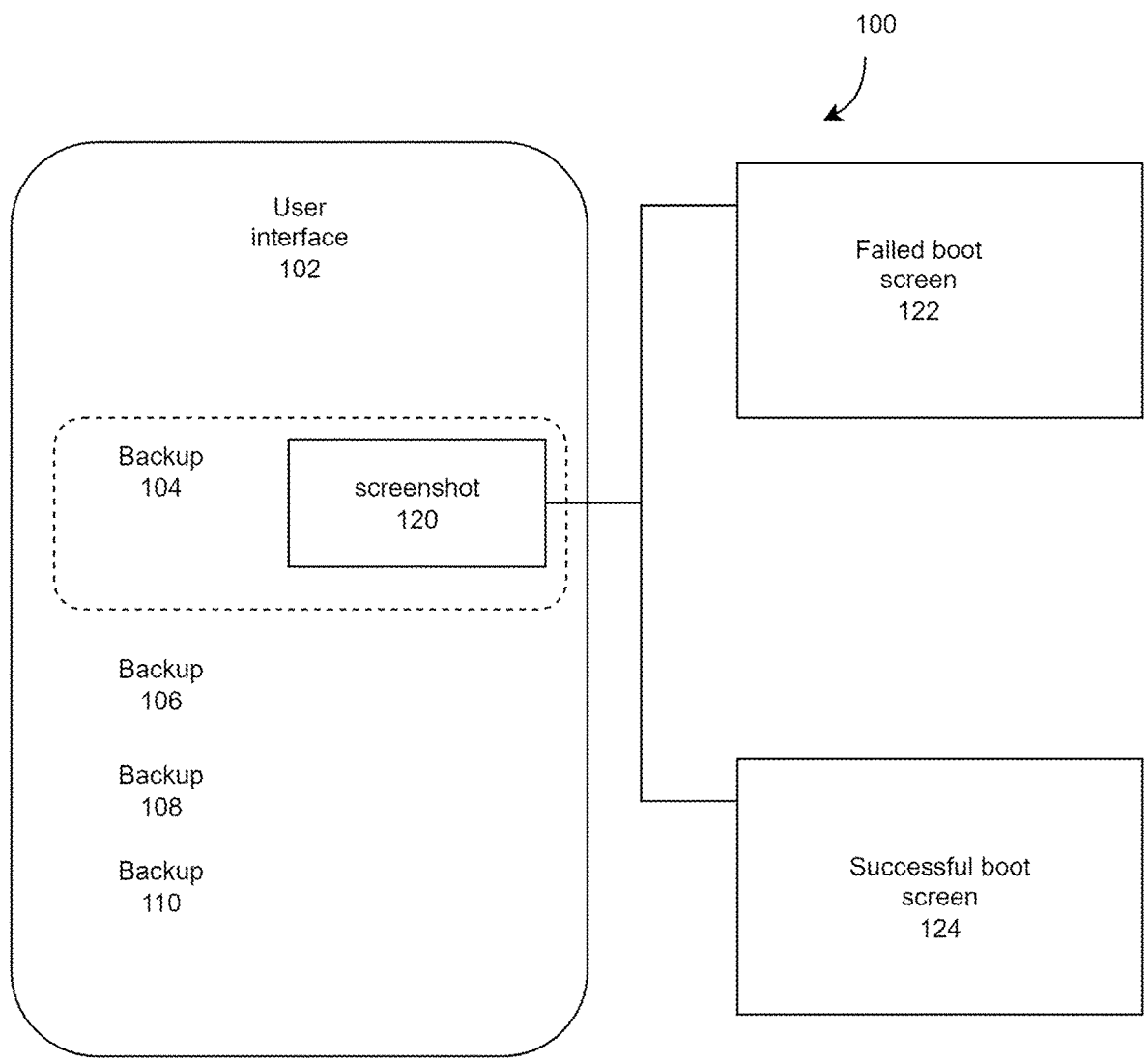
FIG. 1 is a block diagram of a user interface featuring backup status information, including a corresponding screenshot that indicates successful or failed boot status, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

A backup is mounted as a virtual machine (VM) on a hypervisor host, such as VMware or Hyper-V. Then this VM is started and a screenshot of the boot screen is taken. This screenshot is analyzed by a machine-learning engine to provide a verdict on whether or not the boot had been successful. The results of the validation are recorded in the backup properties and are clearly visible to system users.

The hypervisor host is configured for capturing screenshots of the consoles of the hosted virtual machines. A computing device or service is provided that is responsible for screenshot analysis using machine learning. A computing device or service responsible for virtual machine emulation on the hypervisor host is also provided.

An example workflow starts when a backup archive is emulated as a VM on the hypervisor host. An emulation process, as described in U.S. Pat. No. 9,760,448, and which is incorporated herein by reference, may be used. The emulated VM is powered ON to start the boot process of the guest OS. A screenshot of the VM console is taken using corresponding hypervisor API. This screenshot contains the picture of the boot screen of the guest OS.

A machine learning model is trained to recognize screenshot images, for example, by using Convolutional Neural Networks (CNNs). A dataset of labeled images of boot screens is collected. The dataset comprises boot screen images along with corresponding class labels. A wide range of boot screen images is collected, thereby increasing the model's ability to generalize. Image preprocessing ensures consistency and improves the model's performance. Image preprocessing can include resizing boot screen images to a uniform size, normalizing pixel values, and applying data augmentation techniques such as rotation, scaling, or flipping to increase the dataset's variability.

A CNN architecture for image recognition tasks is used comprising convolutional layers, pooling layers, and fully connected layers designed to extract hierarchical features from images. Examples of such architectures include AlexNet, VGGNet, GoogLeNet, and ResNet. CNN architecture parameters are then initialized. Image recognition can include randomly initializing the weights or using pre-trained models that were trained on large image datasets.

The preprocessed images are then fed into the CNN model. During training, the model adjusts its parameters iteratively by minimizing a loss function, typically using an optimization algorithm like stochastic gradient descent (SGD). The loss function quantifies the discrepancy between the predicted class probabilities and the actual labels. After each training iteration (epoch), the model's performance is evaluated using a validation set that contains images not seen during training. The model's progress is monitored to detect overfitting and determine when to stop training. Evaluation metrics can include accuracy, precision, recall, and F1 score.

Hyperparameter settings are adjusted to optimize the model's performance. Hyperparameters include learning rate, batch size, regularization techniques, optimizer choice, and architectural modifications. A grid search may be performed or automated techniques like Bayesian optimization can be used to find the best hyperparameter configuration.

After model training is complete, a separate test is used to determine the model's performance on screen shot images. The model's predictions with the ground truth labels to compute evaluation metrics and assess its effectiveness. The trained model is then deployed to make predictions on new boot screen images. The model's performance is monitored and updated periodically with new data to maintain its accuracy. Further, training the model with new data improves the predictive ability of the model.

In a production environment, captured screenshots of boot screens from computer backups are sent to a special-purpose computing device or service for analysis using the trained model. Analysis of the screenshot is conducted to obtain a verdict. In a typical embodiment, the verdict may be expressed as the answer Yes or NO to the question "Is this screenshot from a successfully booted system?"

The results of analysis are typically stored in backup archive metadata to "mark" a particular backup as validated. Valid backups may then be shown to a system user by way of a GUI or console output. These valid backups may be determined entirely from boot-screen analysis, without any other testing. In an embodiment, the machine-learning model is trained using screenshots from both WINDOWS and LINUX boot screens. To accomplish this, the screenshots used for model training may include graphical boot screens with some text, such as the WINDOWS "blue screen." Screenshots of text-only console boots, such those of certain LINUX distributions, may also be used to train the machine-learning model. Training screenshots may comprise successful or unsuccessful boot screen images or both.

FIG. 1 shows an exemplary user interface 100 for displaying the status of backups to a user. A user interface 102 displays a series of backups 104, 106, 108, and 110 for a particular device. In this configuration, backup 104 has been selected and a screenshot 120 is shown to the user. Screenshot 120 corresponds to the boot screen of this backup when mounted and booted on the hypervisor host. Depending on the verdict of the machine-learning model, screenshot 120 is marked either as a failed boot screen 122 or a successful boot screen 124.

When recovering backed-up data, the user selects the recovery point, for example, one of the backups 104, 106, 108, or 110. In an embodiment, these backups are presented to the user in order of timestamps. Recovery points are indicated for the user by a boot screen result (success or failure) by way of screenshot 120. Interface 102 thus shows for the list of backups 104-110 whether those backups have inconsistent data, corrupted data, or are otherwise non-bootable.

In an embodiment, the user interface shows a sequence of recovery points. In one embodiment, user interface 102 shows only points have been validated. Thus the user can only choose to restore successful backups. In an alternative embodiment, the user is shown both valid and invalid backups, with boot-screen results indicated for each backup. For example, backup 104 may have a corresponding screenshot 120 with a successful boot screen 124 while backups 106-110 have corresponding failed boot screens 122.

Figure 2:
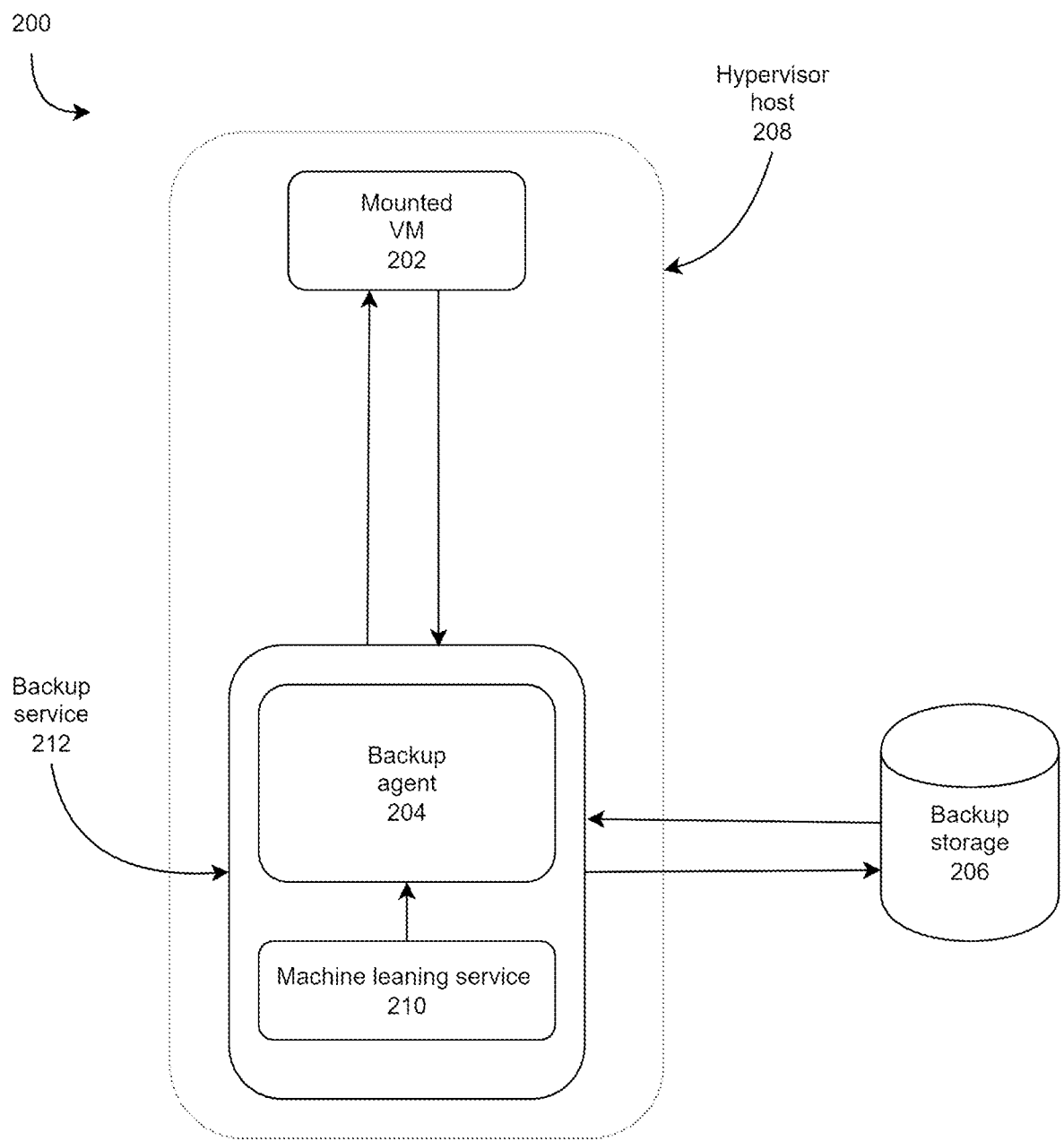
FIG. 2 is a block diagram of a system for testing a mounted VM with a backup service to identify boot status of a backup in storage, according to an embodiment.

FIG. 2 shows system 200, which evaluates boot screens of a mounted VM 202. Backup agent 204 opens a backup archive from backup storage 206 for read access.

Backup agent 204 then emulates disks or volumes from a selected backup as a virtual disk in order to present that backup to hypervisor host 208 in native hypervisor format, such as .vmdk/.vhdx for VMware ESXi or Microsoft Hyper-v. This temporarily mounted VM 202 is a functional clone of the system stored in the backup.

Backup agent 204 sends a command to hypervisor host 208 to power ON mounted VM 202. Backup agent 204 monitors mounted VM 202 until it reaches a fully booted stage, such that a boot screen appears. This may be a successful login screen or, in some cases, a screen showing an indication of boot failure. The failure may comprise a message such as the text on the blue screen that announces a failed boot in the WINDOWS operating system.

A screenshot of the boot screen from the mounted VM 202 is taken by, for example, the API of hypervisor host 208 and sent to the backup agent 204. In an embodiment, the screenshot is never sent to backup storage 206. Backup agent 204, together with a machine-learning service responsible for screenshot analysis comprises backup service 212. The screenshot from mounted VM 202 is analyzed by machine-learning service 210 to get a verdict. Machine-learning service 210 is a screenshot-analysis service that uses a machine-learning model trained to recognize successful and failed boot screens. The verdict of machine-learning service 210 indicates whether the boot screenshot is from a successfully booted system or a system with a failed boot. In an embodiment, detection results are recorded in the backup metadata and without changing any real user data inside the backup.

Figure 3:
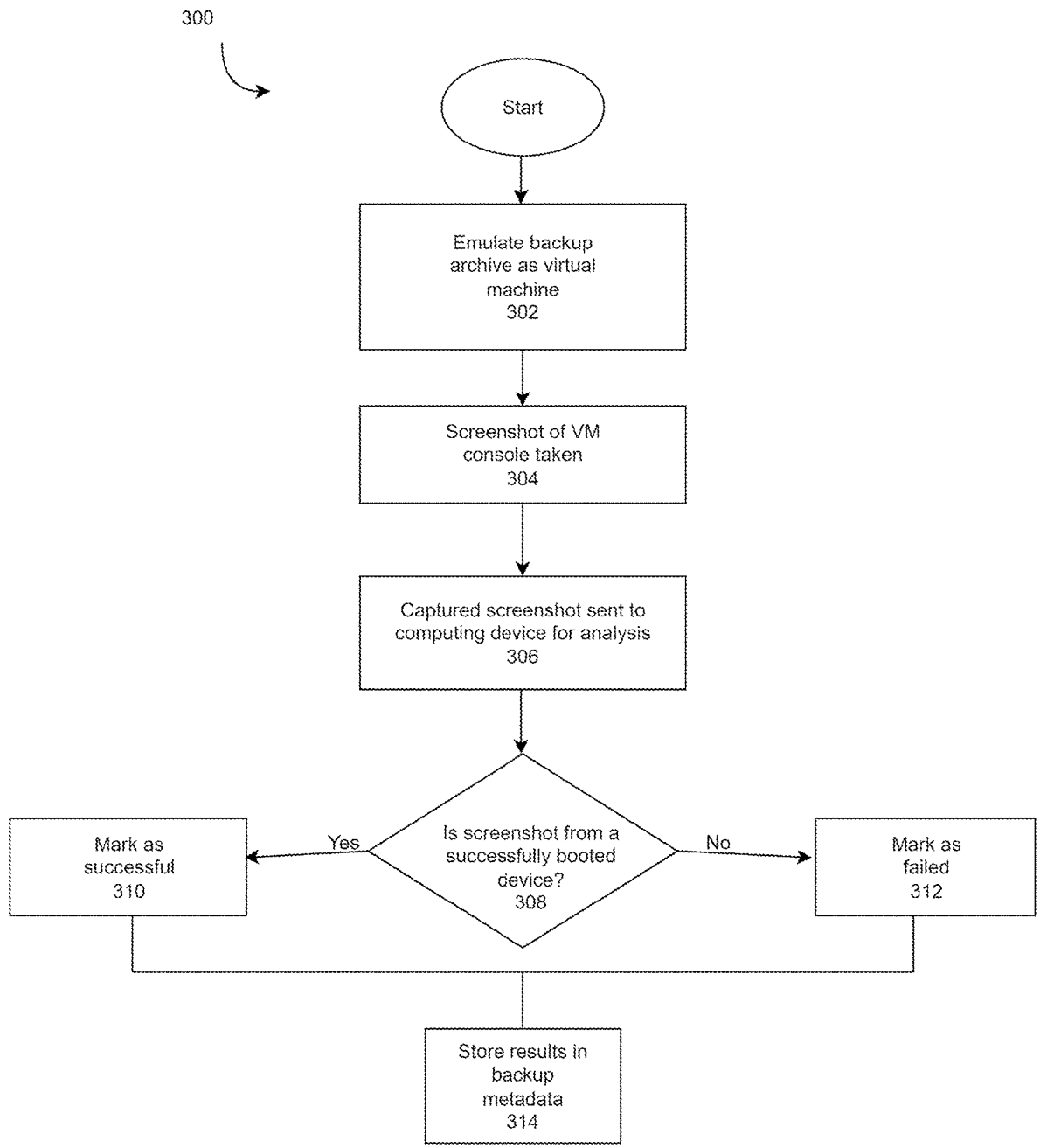
FIG. 3 is a flowchart of a method for testing an emulated backup archive to determine whether the underlying backup will boot successfully, according to an embodiment.

FIG. 3 shows an exemplary method 300 for validating the consistency of backups. At block 302, a backup archive is emulated as a virtual machine. A screenshot of the VM console is taken at block 304. The captured screenshot is sent to a computing device for analysis at block 306. At block 308, analysis of the screenshot comprises a verdict in response to the question whether the screenshot is from a successfully booted device. If the answer is YES, the emulated backup is marked as having a "successful" boot at block 310. If the answer is NO, the emulated backup is marked as having a failed boot at block 312. These results are stored in backup metadata at block 314.

In an embodiment, the screenshots taken at block 304 are stored in a dedicated secure storage, for example, in a datacenter. In a further embodiment, the screenshots are stored in a location separate from the actual backups. In another embodiment, backup metadata does not contain the screenshot itself and contains only a reference link to it.

In an embodiment, a referenced link to the screenshot is secured by requiring user authentication in order to access it. In this embodiment, access to the screenshot is limited to authorized users of the system of FIG. 2 or the method of FIG. 3. Thus, simply having access to backup storage 206 does not by itself give any access to the screenshots taken when the backup was mounted as a VM.

Figure 4:
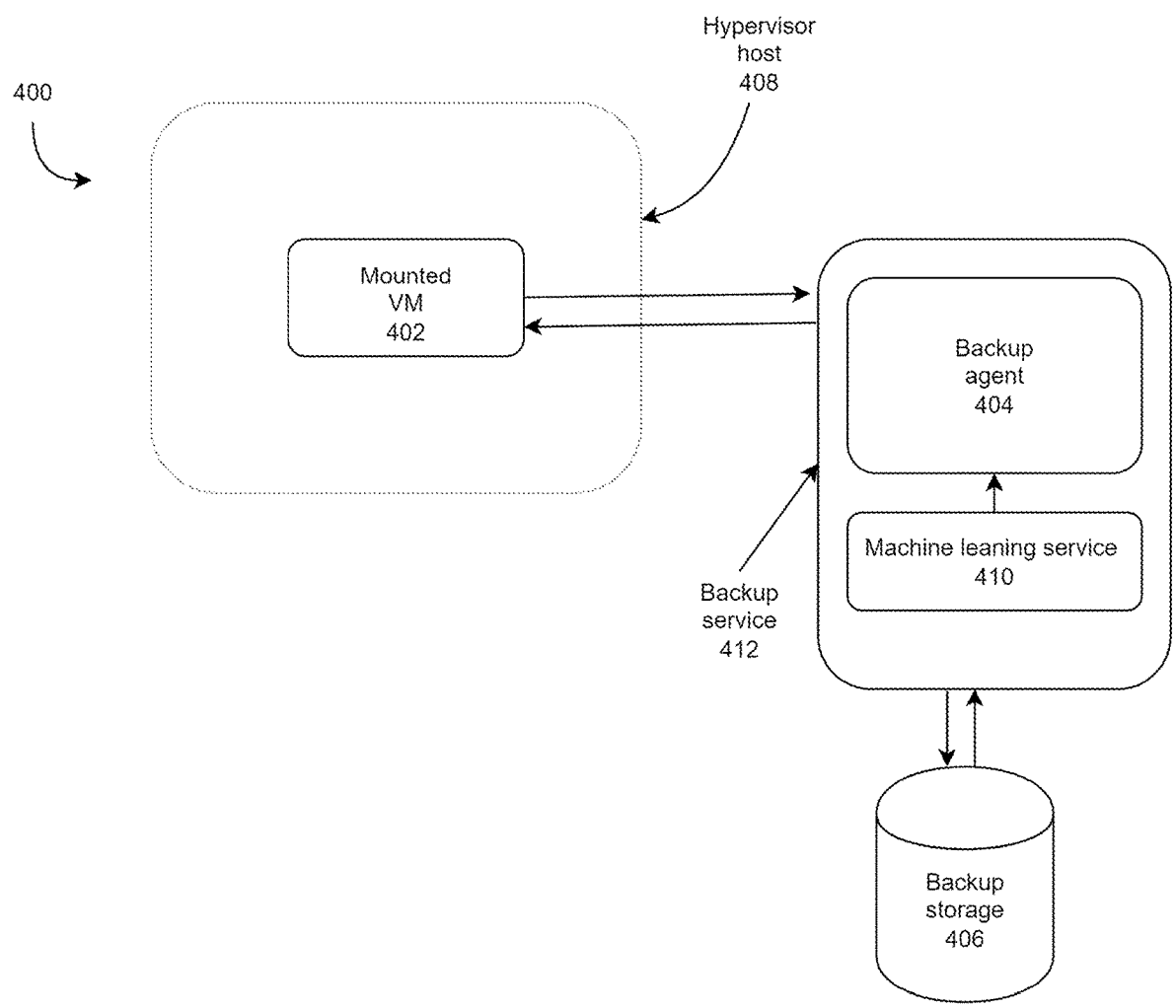
FIG. 4 is a block diagram of an alternative system for evaluating boot screens, according to an embodiment.

FIG. 4 shows an alternative system 400 for evaluating boot screens. In this alternative configuration 400, boot screens of a mounted VM 402 are evaluated by a backup agent 404 that is remote from backup storage 406 and hypervisor host 408. Backup agent 404 opens a backup archive from backup storage 406 for read access. Backup agent 404 then emulates disks or volumes from a selected backup as a virtual disk in order to present that backup to hypervisor host 408 in native hypervisor format, such as .vmdk/.vhdx for VMware ESXi or Microsoft Hyper-v. This temporarily mounted VM 402 is a functional clone of the system stored in the backup.

Backup agent 404 sends a command to hypervisor host 408 to power ON mounted VM 402. Backup agent 404 monitors mounted VM 402 until it reaches a fully booted stage, such that a boot screen appears. This may be a successful login screen or, in some cases, a screen showing an indication of boot failure. The failure may comprise a message such as the text on the blue screen that announces a failed boot in the WINDOWS operating system.

A screenshot of the boot screen from the mounted VM 402 is taken by, for example, the API of hypervisor host 408 and sent to the backup agent 404. In an embodiment, the screenshot is never sent to backup storage 406. Backup agent 404, together with a machine-learning service responsible for screenshot analysis comprises backup service 412. The screenshot from mounted VM 402 is analyzed by machine-learning service 410 to get a verdict. Machine-learning service 410, like machine-learning service 210 of FIG. 2, is a screenshot-analysis service that uses a machine-learning model trained to recognize successful and failed boot screens. The verdict of machine-learning service 410 indicates whether the boot screenshot is from a successfully booted system or a system with a failed boot. In an embodiment, detection results are recorded in the backup metadata and without changing any real user data inside the backup.

Figure 5:
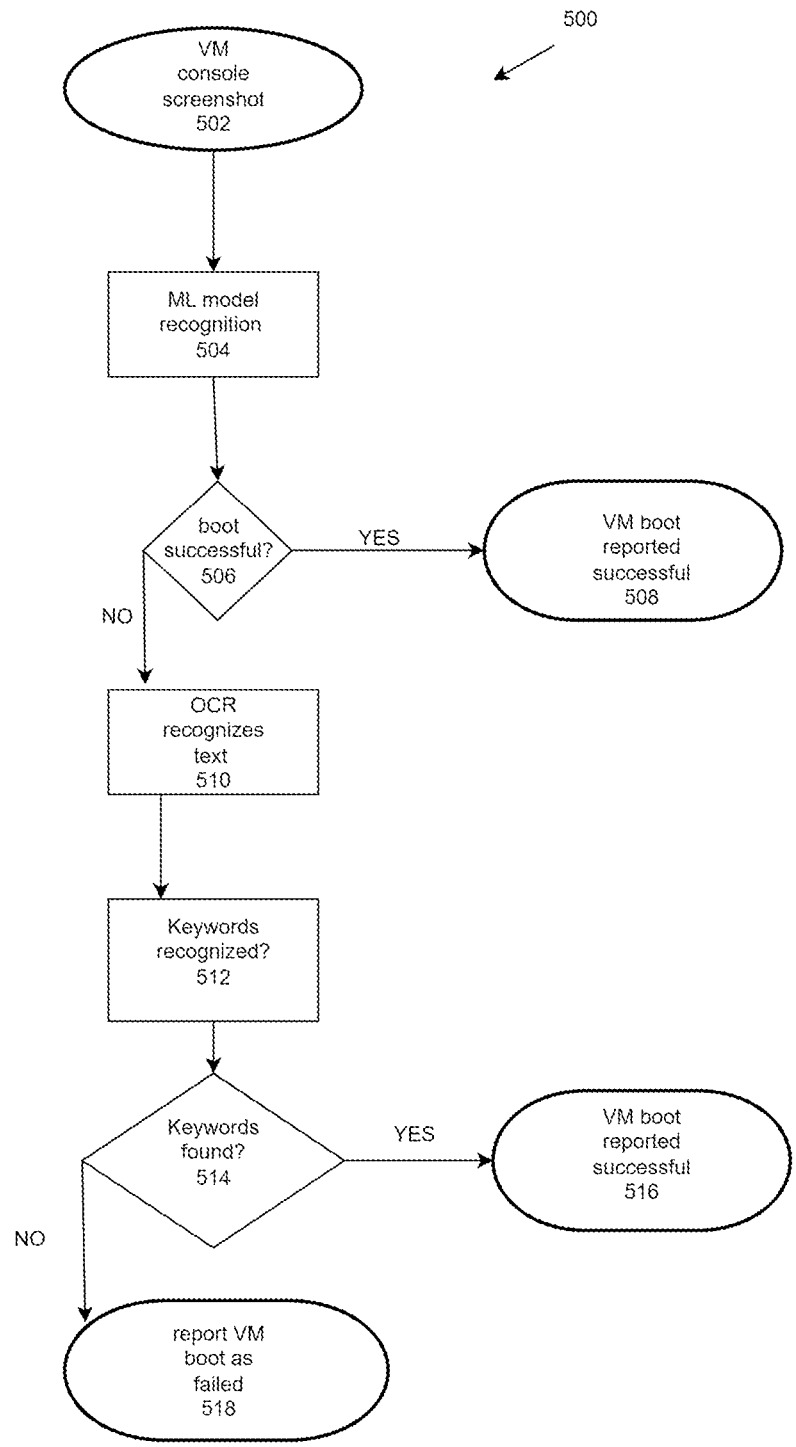
FIG. 5 is a flowchart of an alternative method for evaluating boot screens, according to an embodiment.

FIG. 5 shows an alternative method 500 for evaluating boot screens. The method starts with a VM console screenshot for analysis at block 502. At block 504, a machine learning (ML) model analyzes the VM console screenshot attempting to recognize a successful boot. At block 506, a determination is made from the screenshot about whether the boot is successful using the ML model. If the ML model determines that the boot is successful, a successful boot report is made at block 508. If the boot determination is not successful, then the method proceeds to block 510, which comprises Optical Character Recognition (OCR) text recognition.

At block 510, OCR converts printed text into machine-readable text. Algorithms and pattern recognition techniques are used to recognize and extract characters from the boot screen screenshot. In a typical embodiment, the OCR algorithm takes an input image or scanned document and pre-processes it to enhance its quality and prepare it for character recognition. In the context of boot screen screenshots, this operation may involve cleaning and enhancing the image, as well as noise removal. The OCR algorithm analyzes the preprocessed image to find areas containing text. To do this, the OCR algorithm identifies the boundaries of text regions or lines, separating them from other parts of the image. When the text regions are identified, the OCR algorithm separates them into individual characters or words. The OCR algorithm then extracts relevant features from the segmented characters. Exemplary features include curves, angles, and lines. The extracted features distinguish one character from another in the screenshot. The OCR algorithm matches the extracted features with the closest matching characters. After character recognition, the OCR algorithm reconstructs the recognized characters to recreate the original text in a machine-readable format. In some embodiments, OCR output may be post-processed to improve the accuracy and quality of the recognized text. For example, the output can be checked for spelling errors and formatting.

At block 512, the OCR algorithm uses a machine learning model to recognize keywords in the VM console screenshot. In an embodiment, a database or statistical model is used that contains information about characters indicative of success or failure in various boot screens. For example, WINDOWS and various LINUX distributions generate specific text messages on screen when a system fails to boot. In an embodiment, keywords are extracted from this text. Keywords are searched for at block 514. If keywords are found, a successful VM boot is reported at block 516. If keywords are not found at block 514, the VM boot is reported as failed at block 518. In an embodiment, block 514 is repeated. A timer can also be used so that a failed boot is reported at block 518 only after the passage of a certain amount of time. The report timer can be combined with timed repetition of the keyword search at block 514. One example of such a combination is a keyword search that is repeated every 30 seconds for a maximum of 3 minutes before the VM boot is reported as failed. In such an embodiment, six attempts are required before reporting a VM boot as failed. Other combinations may also be selected. In alternative embodiments, the timeout for reporting a failed boot at block 518 is a total number of attempts or a total elapsed time. For example, a failed boot is reported after 5 attempts, regardless of the elapsed time. Alternatively, a failed boot is reported after 5 minutes, regardless of the number of attempts.

In alternative embodiments, a solution such as the Tesseract OCR engine is used. In these embodiments, Tesseract OCR is accessed by way of API integration. API requests are sent to the Tesseract OCR engine. With an API request, screenshot images are sent for text extraction. Image preprocessing features, such as those offered by the Tesseract OCR engine, may be used to ensure that the image quality is as high as possible to achieve accurate data extraction results. In an embodiment, OpenCV (Open Computer Vision Library) may be used with the Tesseract OCR engine to increase the image quality before data extraction. Together with trained data sets or OpenCV, the Tesseract OCR engine processes the input image and extracts the data. As the data extracted from the input is converted into a desired format that Tesseract supports, including PDF, plain text, HTML, TSV, and XML. Once the output is ready, an API response is received with the finalized output.

The invention claimed is:

1. A method for validating the consistency of a backup in a computer system comprising a hypervisor host, a screenshot-analysis service, a virtual-machine emulation service on the hypervisor host, and a backup archive where the backup is stored, the method comprising:
   emulating the backup archive in native hypervisor format as a guest virtual machine (VM) with a guest operating system (OS) on the hypervisor host;
   booting the guest VM by commanding the hypervisor host to power on the guest VM;
   monitoring the guest VM using the hypervisor host until the guest VM reaches a fully booted stage and a boot screen appears;
   taking a screenshot of the guest VM console comprising an image of the guest OS boot screen after the VM reaches the fully booted stage using an API of the hypervisor host;
   training a machine learning model with data comprising boot-screen images;
   testing the machine learning model to determine a sufficient effectiveness of the model;
   analyzing the screenshot using the screenshot-analysis service to determine whether the screenshot reflects a successful boot of the guest OS, wherein the screenshot-analysis service determines whether the screenshot reflects a successful boot using the machine-learning model;
   when the machine-learning model determines an unsuccessful boot, searching for keywords in screenshot using an OCR-analysis service to further determine whether the screenshot reflects a successful boot of the guest OS;
   associating the determination of the screenshot-analysis service with the emulated backup archive;
   presenting a plurality of such determinations of the screenshot-analysis service for a particular emulated backup archive to a computer user by way of a user interface, wherein the plurality of determinations are marked in the user interface at least by a timestamp and an indication of a boot-screen determination;
   storing metadata corresponding to the plurality of determinations in the backup archive; and
   booting the backup archive as a recovery point for the computer system based on a user selection of at least one of the plurality of determinations.

2. The method of claim 1, wherein only indications of a successful boot-screen determination are shown to the user.

3. The method of claim 1, wherein the indications of boot-screen determinations include both successful and unsuccessful determinations.

4. The method of claim 1, wherein the screenshot is stored in a location remote from the backup archive.

5. The method of claim 1, wherein access to the screenshot is restricted to the user by requiring authentication of an identity of the user.

6. The method of claim 1, wherein metadata about boot-screen determinations is available only to authorized users of the backup archive.

7. A system for validating the consistency of a computer backup from a screenshot, the system comprising:
   a hypervisor host;
   a virtual machine mounted on the hypervisor host and comprising a guest operating system (OS), the guest OS being booted from the computer backup in a native hypervisor format;

a backup agent monitoring the virtual machine using the hypervisor host until the virtual machine reaches a fully booted stage and a boot screen appears;

a screenshot tool for capturing an image of the guest OS boot screen after the VM reaches the fully booted stage using an API of the hypervisor host;

a screenshot-analysis service comprising a machine-learning model trained with data from successful and failed boot screen images and tested to determine a sufficient effectiveness of the model;

a virtual-machine emulation service on the hypervisor host;

a user interface configured to show a plurality of results of the screenshot-analysis service to a user;

a backup archive configured to store the computer backup; and an OCR-analysis service for searching for keywords in the image of the guest OS boot screen;

wherein the screenshot-analysis service comprises a machine-learning model configured to make boot determinations corresponding to successful or failed booting of the guest OS, wherein the backup archive is configured to store metadata corresponding to the plurality of boot determinations, and wherein the backup archive is booted as a recovery point for the system based on a user selection of at least one of the plurality of boot determinations.

8. The system of claim 7, wherein the user interface is configured to show only indications of a successful boot-screen determination to the user.

9. The system of claim 7, wherein the user interface is configured to show both successful and unsuccessful boot-screen determinations.

10. The system of claim 7, wherein the screenshot-analysis service is configured to store screenshots at a location remote from the backup archive.

11. The system of claim 7, wherein access to the screenshot is restricted to the user by requiring authentication of an identity of the user.

12. The system of claim 7, wherein the machine-learning model of the screenshot-analysis service has been trained to recognize the keywords.

13. A method for validating the consistency of a backup in a computer system comprising a hypervisor host, a screenshot-analysis service, a virtual-machine emulation service on the hypervisor host, and a backup archive where the backup is stored, the method comprising:

emulating the backup archive in native hypervisor format as a guest virtual machine (VM) with a guest operating system (OS) on the hypervisor host;

booting the guest VM by commanding the hypervisor host to power on the guest VM;

monitoring the guest VM using the hypervisor host until the guest VM reaches a fully booted stage and a boot screen appears;

taking a screenshot of the guest VM console comprising an image of the guest OS boot screen after the VM reaches the fully booted stage using an API of the hypervisor host;

training a machine learning model with data from successful and unsuccessful boot-screen images;

testing the machine learning model to determine a sufficient effectiveness of the model;

analyzing the screenshot using the screenshot-analysis service to determine whether the screenshot reflects a successful boot of the guest OS, wherein the screenshot-analysis service cannot determine whether the screenshot reflects a successful boot using the machine-learning model trained;

searching for keywords in the image of the guest OS boot screen using an OCR-analysis service;

reporting the VM boot as failed if no keywords are found and reporting the VM boot as successful if one or more keywords are found, and booting the backup archive as a recovery point for the computer system based on the successful VM boot.

14. The method of claim 13, further comprising:

associating the determination of the screenshot-analysis service with the emulated backup archive; and presenting a plurality of such determinations of the screenshot-analysis service for a particular emulated backup archive to a computer user by way of a user interface, wherein the plurality of determinations are marked in the user interface at least by a timestamp and an indication of a boot-screen determination.

15. The method of claim 13, wherein only indications of a successful boot-screen determination are shown to the user.

16. The method of claim 13, wherein the indications of boot-screen determinations include both successful and unsuccessful determinations.

17. The method of claim 13, wherein the screenshot is stored in a location remote from the backup archive.

18. The method of claim 13, wherein access to the screenshot is restricted to the user by requiring authentication of an identity of the user.

19. The method of claim 13, wherein metadata about boot-screen determinations is available only to authorized users of the backup archive.

20. The method of claim 1, wherein storing metadata corresponding to the plurality of determinations in the backup archive is done without changing any user data inside the backup archive.

\* \* \* \* \*